US011931959B2

(12) United States Patent
Tsunoya et al.

(10) Patent No.: US 11,931,959 B2
(45) Date of Patent: Mar. 19, 2024

(54) THREE-DIMENSIONAL SHAPING DEVICE

(71) Applicant: SEIKO EPSON CORPORATION, Tokyo (JP)

(72) Inventors: Akihiko Tsunoya, Okaya (JP); Koji Fujimori, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/899,665

(22) Filed: Aug. 31, 2022

(65) Prior Publication Data

US 2023/0061480 A1   Mar. 2, 2023

(30) Foreign Application Priority Data

Sep. 1, 2021   (JP) ................................. 2021-142233

(51) Int. Cl.
| | |
|---|---|
| *B29C 64/245* | (2017.01) |
| *B29C 64/20* | (2017.01) |
| *B29C 64/209* | (2017.01) |
| *B33Y 30/00* | (2015.01) |
| B29C 64/118 | (2017.01) |

(52) U.S. Cl.
CPC ............ *B29C 64/245* (2017.08); *B29C 64/20* (2017.08); *B29C 64/209* (2017.08); *B33Y 30/00* (2014.12)

(58) Field of Classification Search
CPC ..... B29C 64/20; B29C 64/106; B29C 64/118; B29C 64/209; B29C 64/245; B33Y 30/00
See application file for complete search history.

(56) References Cited

U.S. PATENT DOCUMENTS

| | | | |
|---|---|---|---|
| 2016/0144563 A1* | 5/2016 | Elliott .................... | B33Y 30/00 264/401 |
| 2017/0036400 A1* | 2/2017 | Loeffler ................ | B29C 64/245 |
| 2017/0190120 A1* | 7/2017 | Bloome ................ | B29C 64/393 |
| 2018/0186038 A1* | 7/2018 | Bigus ..................... | B29C 48/05 |

(Continued)

FOREIGN PATENT DOCUMENTS

| | | |
|---|---|---|
| JP | 2020-029019 A | 2/2020 |
| JP | 2020-192741 A | 12/2020 |
| JP | 2020-192777 A | 12/2020 |

*Primary Examiner* — Jerzi H Moreno Hernandez
(74) *Attorney, Agent, or Firm* — Harness, Dickey & Pierce, P.L.C.

(57) ABSTRACT

A three-dimensional shaping device includes: a stage whose shaping surface has a first groove and a second groove extending in a first direction; a discharge unit configured to supply a shaping material to the shaping surface; a movement mechanism configured to relatively move the stage and the discharge unit; and a control unit configured to control the discharge unit and the movement mechanism. The control unit is configured to control the movement mechanism and the discharge unit to: form a first girder layer by supplying the shaping material to the first groove while relatively moving the discharge unit in the first direction with respect to the stage, form a second girder layer by supplying the shaping material to the second groove while relatively moving the discharge unit in the first direction with respect to the stage, and form a first floor layer coupling the first girder layer and the second girder layer by supplying the shaping material to the shaping surface while relatively moving the discharge unit with respect to the stage.

9 Claims, 13 Drawing Sheets

(56) References Cited

U.S. PATENT DOCUMENTS

| | | | |
|---|---|---|---|
| 2019/0061248 A1* | 2/2019 | Saito | B29C 64/245 |
| 2020/0061914 A1 | 2/2020 | Onishi | |
| 2020/0101672 A1* | 4/2020 | Watanabe | B33Y 40/00 |
| 2020/0376744 A1* | 12/2020 | Watanabe | B29C 64/393 |
| 2020/0376745 A1 | 12/2020 | Watanabe et al. | |

* cited by examiner

THREE-DIMENSIONAL SHAPING DEVICE

The present application is based on, and claims priority from JP Application Serial Number 2021-142233, filed Sep. 1, 2021, the disclosure of which is hereby incorporated by reference herein in its entirety.

BACKGROUND

1. Technical Field

The present disclosure relates to a three-dimensional shaping device.

2. Related Art

There have been various three-dimensional shaping devices that form a three-dimensional shaped object by a heat-dissolution lamination method of depositing a shaping material on a shaping surface of a stage. Hereinafter, the three-dimensional shaped object is referred to as a shaped object. When the shaping surface is flat, the shaped object may move on the shaping surface, and thus a method for fixing the shaped object to the shaping surface is required. JP-A-2020-29019 discloses a method of making a shaped object to be less likely to move on a shaping surface by forming an uneven shaping surface of a stage.

For example, a stage whose shaping surface is arranged with concave portions in a lattice shape is introduced. A discharge unit discharges a shaping material to the concave portions formed in the lattice shape. A resin entering the concave portions is formed into convex portions. The convex portions and the concave portions are engaged with each other to detachably join the shaped object and the stage.

However, when the shaping material is a material having a large resin shrinkage rate such as polypropylene, a gap can be formed between the concave portions and the convex portions of the resin entering the concave portions. According to a three-dimensional shaping device disclosed in JP-A-2020-29019, the convex portions may be detached from the concave portions. At this time, it is difficult for the shaped object formed on the shaping surface to maintain a positional relationship with the stage. Therefore, there has been a demand for a three-dimensional shaping device capable of maintaining a positional relationship between a shaped object formed on a shaping surface and a stage even when a resin shrinkage rate of a shaping material is large.

SUMMARY

A three-dimensional shaping device includes: a stage whose shaping surface has a first groove extending in a first direction and a second groove extending in the first direction; a discharge unit configured to supply a shaping material to the shaping surface; a movement mechanism configured to relatively move the stage and the discharge unit; and a control unit configured to control the discharge unit and the movement mechanism. The control unit is configured to control the movement mechanism and the discharge unit to: form a first girder layer by supplying the shaping material to the first groove while relatively moving the discharge unit in the first direction with respect to the stage, form a second girder layer by supplying the shaping material to the second groove while relatively moving the discharge unit in the first direction with respect to the stage, and form a first floor layer coupling the first girder layer and the second girder layer by supplying the shaping material to the shaping surface while relatively moving the discharge unit with respect to the stage.

DESCRIPTION OF EXEMPLARY EMBODIMENTS

First Embodiment

Figure 1:
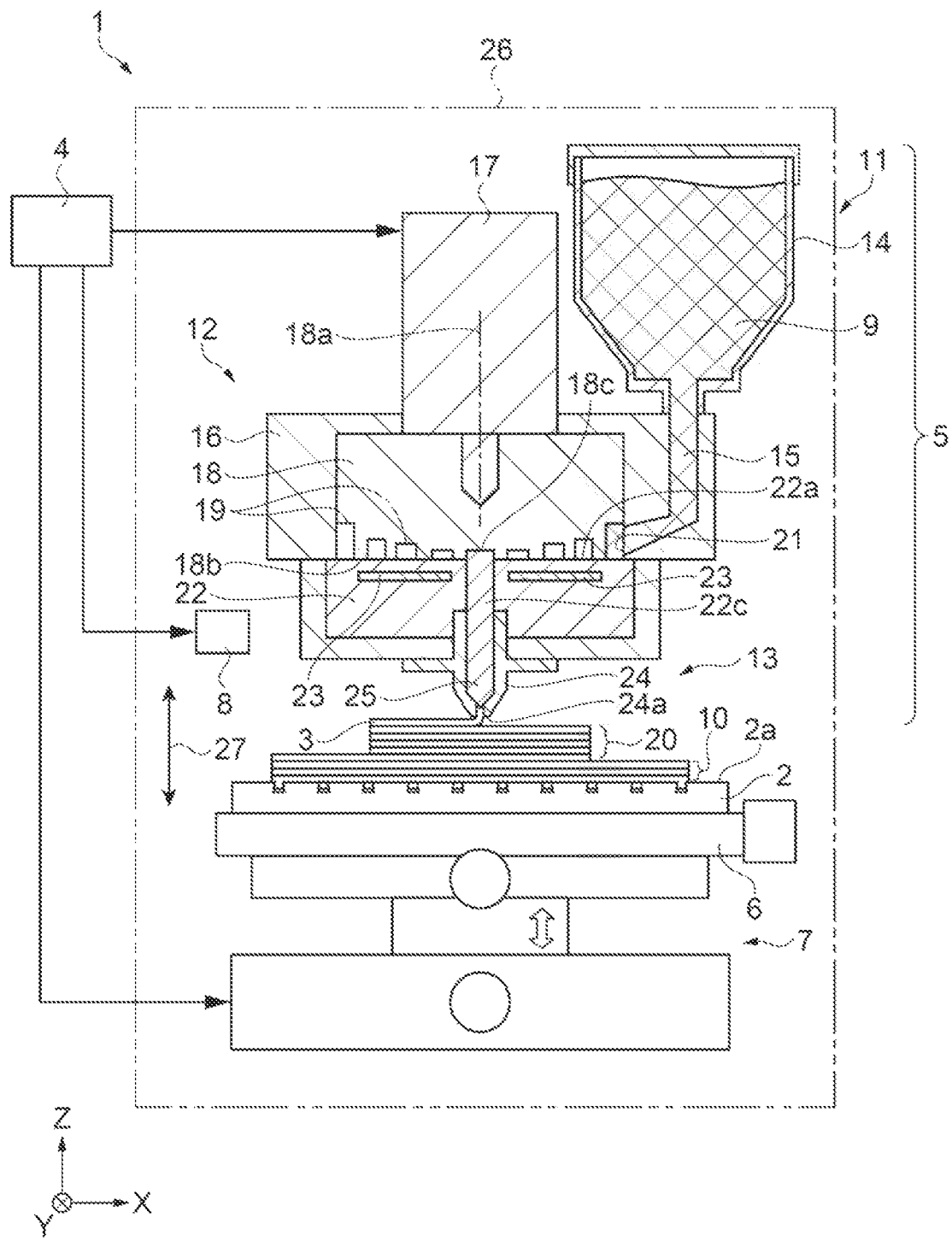
FIG. 1 is a schematic diagram showing a configuration of a three-dimensional shaping device according to a first embodiment.

In the present embodiment, a characteristic example of a three-dimensional shaping device will be described. FIG. 1 shows arrows indicating X, Y, and Z directions orthogonal to each other. For example, the X direction and the Y direction are directions parallel to a horizontal plane, and a positive Z direction is a direction opposite to a plummet direction. The plummet direction is a direction of gravity.

A three-dimensional shaping device 1 forms a shaped object 20 by depositing a shaping material 3 on a shaping surface 2a of a stage 2. In addition to the stage 2, the three-dimensional shaping device 1 includes a control unit 4 that controls the three-dimensional shaping device 1, a shaping unit 5 that generates the shaping material 3 and deposits the shaping material 3 on the stage 2, a base 6 that supports the stage 2, and a movement mechanism 7 that moves the base 6. The control unit 4 controls a position for depositing the shaping material 3.

The control unit 4 controls operations of the entire three-dimensional shaping device 1. The control unit 4 is implemented by a computer including a processor and a main storage device. The control unit 4 exerts various functions by the processor executing programs and instructions read from the main storage device.

According to shaping data defining the shaped object 20, the control unit 4 controls the shaping unit 5 and the movement mechanism 7. The control unit 4 executes a shaping process of forming the shaped object 20 by depositing the shaping material 3 on the shaping surface 2a of the stage 2. The control unit 4 controls a temperature control unit 8 to adjust a temperature of the stage 2.

Under the control of the control unit 4, the shaping unit 5 generates the melted paste-like shaping material 3. The shaping unit 5 laminates the shaping material 3 at a target position on the shaping surface 2a. The shaping unit 5 includes a material supply unit 11 that is a supply source of a raw material 9, a generation unit 12 that converts the raw material 9 into the shaping material 3, and a discharge unit 13 that discharges the shaping material 3.

The material supply unit 11 supplies the raw material 9 to the generation unit 12. The raw material 9 is a material for generating the shaping material 3. The material supply unit 11 is implemented by a hopper 14 that accommodates the raw material 9, a communication passage 15, and the like. The hopper 14 includes a discharge port in a negative Z direction. The discharge port is coupled to the generation unit 12 via the communication passage 15. The raw material 9 is charged into the hopper 14 in a form of pellets, powder, or the like.

The generation unit 12 melts the raw material 9 supplied from the material supply unit 11 to generate the paste-like shaping material 3, which exhibits fluidity. The generation unit 12 supplies the shaping material 3 to the discharge unit 13. The generation unit 12 includes a screw case 16, a drive motor 17, a flat screw 18, and a screw facing portion 22.

The flat screw 18 has a substantially cylindrical shape whose height in an axial direction, which is a direction along a central axis of the flat screw 18, is smaller than a diameter thereof. The flat screw 18 is disposed such that the axial direction thereof is parallel to the Z direction. The central axis of the flat screw 18 coincides with a rotation axis 18a. The flat screw 18 rotates about the rotation axis 18a.

The flat screw 18 is accommodated in the screw case 16. The flat screw 18 is coupled to a rotation shaft of the drive motor 17. The flat screw 18 is rotated by a rotational driving force generated by the drive motor 17. The drive motor 17 is driven under the control of the control unit 4.

The flat screw 18 has a groove-formed surface 18b that intersects with the rotation axis 18a. A spiral scroll groove 19 is formed on the groove-formed surface 18b. The groove-formed surface 18b is disposed on the negative Z side of the flat screw 18. The scroll groove 19 is coupled to a material inflow port 21. The material inflow port 21 opens on an outer peripheral side surface of the flat screw 18. The scroll groove 19 extends in a spiral shape from the material inflow port 21 toward a central portion 18c. The rotation axis 18a of the flat screw 18 passes through the central portion 18c.

The groove-formed surface 18b of the flat screw 18 faces an upper surface 22a of the screw facing portion 22. A space is formed between the scroll groove 19 of the groove-formed surface 18b and the upper surface 22a of the screw facing portion 22. In the material inflow port 21, the communication passage 15 of the material supply unit 11 and the scroll groove 19 are coupled to each other via a gap therebetween. The raw material 9 is supplied from the communication passage 15 of the material supply unit 11 to the scroll groove 19.

A heater 23 is embedded in the screw facing portion 22. The heater 23 heats the raw material 9 supplied into the scroll groove 19 of the rotating flat screw 18. In the scroll groove 19, the raw material 9 is melted into the shaping material 3. The shaping material 3 exhibits fluidity and becomes a paste. The shaping material 3 flows along the scroll groove 19 by rotation of the flat screw 18. The shaping material 3 is guided to the central portion 18c of the flat screw 18. The shaping material 3 flowing into the central portion 18c is supplied to the discharge unit 13 through a communication hole 22c. The communication hole 22c is provided at a center of the screw facing portion 22.

The discharge unit 13 includes a nozzle 24 and a flow path 25. The nozzle 24 is coupled to the communication hole 22c of the screw facing portion 22 through the flow path 25. The flow path 25 guides the shaping material 3 generated by the generation unit 12 to the nozzle 24. The flow path 25 extends along the Z direction, and the flow path 25 and the nozzle 24 are arranged along the Z direction. The nozzle 24 discharges the shaping material 3 from a discharge port 24a at a tip end toward the stage 2 on the base 6. The discharge unit 13 supplies the shaping material 3 to the shaping surface 2a. The discharge unit 13 includes the nozzle 24 which discharges the shaping material 3.

The base 6 and the stage 2 are arranged on the negative Z side of the nozzle 24. The stage 2 is placed on the base 6. The shaping surface 2a of the stage 2 faces the discharge port 24a of the nozzle 24. The shaping surface 2a is substantially horizontal.

Under the control of the control unit 4, the movement mechanism 7 changes a relative positional relationship between the stage 2 and the shaping surface 2a and the nozzle 24. The movement mechanism 7 includes a three-axis positioner that moves the base 6 in three directions including the X, Y, and Z directions by driving forces of three motors. The movement mechanism 7 relatively moves the stage 2 and the discharge unit 13. The control unit 4 controls the discharge unit 13 and the movement mechanism 7.

The three-dimensional shaping device 1 is provided in a chamber 26 that is a processing chamber for shaping. The three-dimensional shaping device 1 forms a sacrificial layer 10 and the shaped object 20 in the chamber 26. The sacrificial layer 10 is provided such that the shaped object 20 is not detached from the stage 2. The sacrificial layer 10 is formed to form the shaped object 20. After the sacrificial layer 10 and the shaped object 20 are formed, the shaped object 20 is separated from the sacrificial layer 10. The separated sacrificial layer 10 is discarded. The control unit 4 adjusts a temperature inside the chamber 26 and controls the temperature of the stage 2 by the temperature control unit 8.

In parallel with the discharge of the shaping material 3 by the nozzle 24, the movement mechanism 7 moves the shaping surface 2a. The shaping material 3 of a first stage is arranged. Next, the movement mechanism 7 moves the shaping surface 2a in the negative Z direction. Next, the shaping material 3 of a second stage is arranged in a superimposed manner on the shaping material 3 of the first stage. Further, the movement of the shaping surface 2a in the negative Z direction and the arrangement of the shaping material 3 are repeatedly performed. As a result, the shaping materials 3 of third and subsequent stages are arranged in a superimposed manner. Accordingly, a method of forming the shaped object 20 by laminating the heat-dissolved shaping material 3 is called a heat-dissolution lamination method. A laminating direction 27 on which the shaping material 3 is laminated is the Z direction.

A main component of a stage material, which is a material of the stage 2, is glass or aluminum. According to this configuration, the main component of the stage material is glass or aluminum. The glass and the aluminum maintain rigidity even at a temperature when the shaping material 3 is supplied. Therefore, since the stage 2 can maintain the rigidity even when the shaping material 3 is discharged onto the shaping surface 2a, it is possible to prevent deterioration of shaping accuracy of the shaped object 20.

Figure 2:
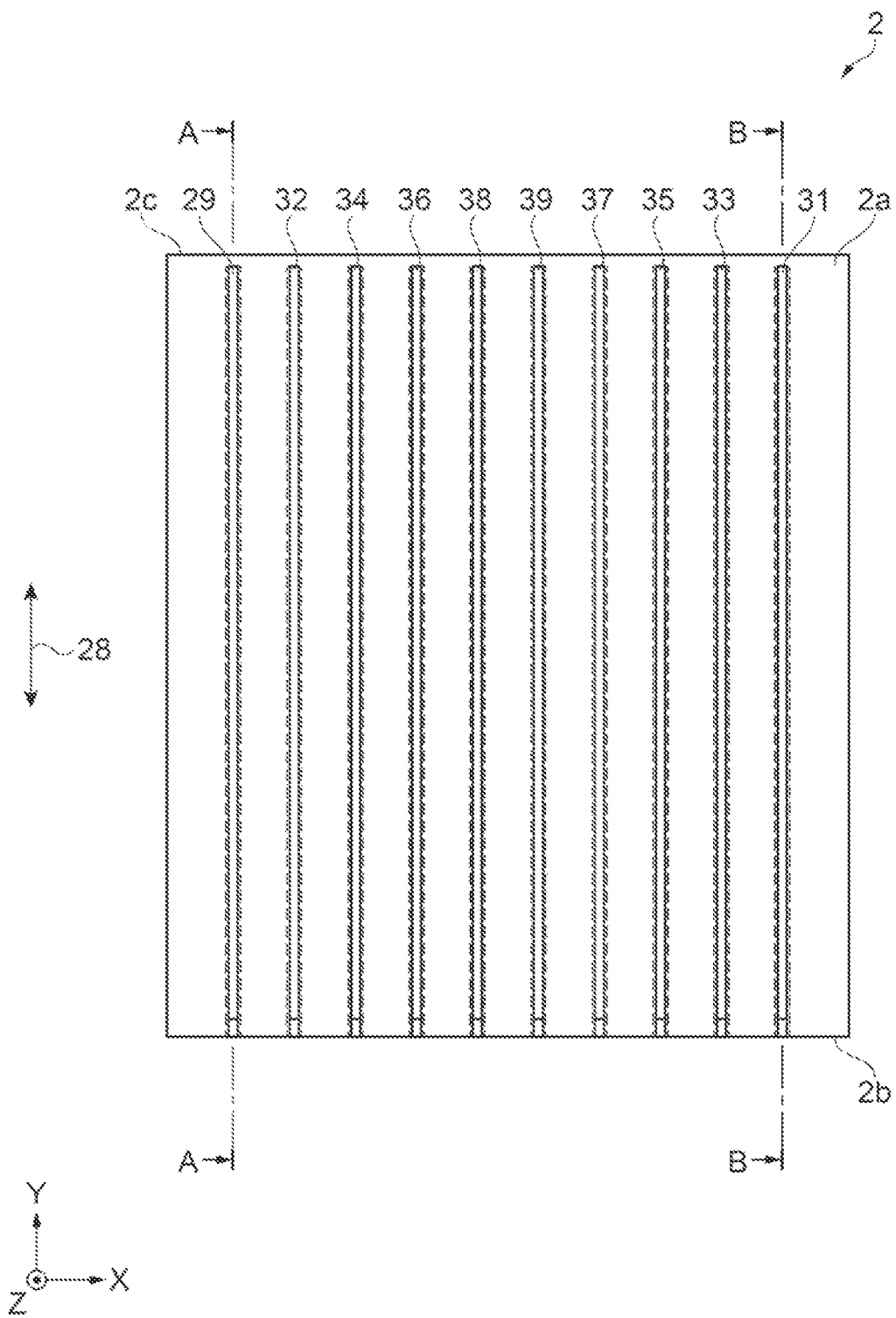
FIG. 2 is a schematic plan view showing a configuration of a stage.

As shown in FIG. 2, a positive Y direction and a negative Y direction are defined as a first direction 28. The stage 2 includes a first groove 29, a second groove 31, a third groove 32, a fourth groove 33, a fifth groove 34, a sixth groove 35, a seventh groove 36, an eighth groove 37, a ninth groove 38, and a tenth groove 39 in the shaping surface 2a. The first groove 29 to the tenth groove 39 extend in the first direction 28.

The stage 2 has a first side surface 2b that intersects with the shaping surface 2a on the negative Y side, which is one side of the first direction 28. One end of the first groove 29 opens on the first side surface 2b. One end of the second groove 31 opens on the first side surface 2b. One end of each of the third groove 32 to the tenth groove 39 opens on the first side surface 2b. The stage 2 has a second side surface 2c that intersects with the shaping surface 2a in the positive Y direction, which is one side of the first direction 28. The other end of each of the first groove 29 to the tenth groove 39 does not open on the second side surface 2c.

Figure 3:
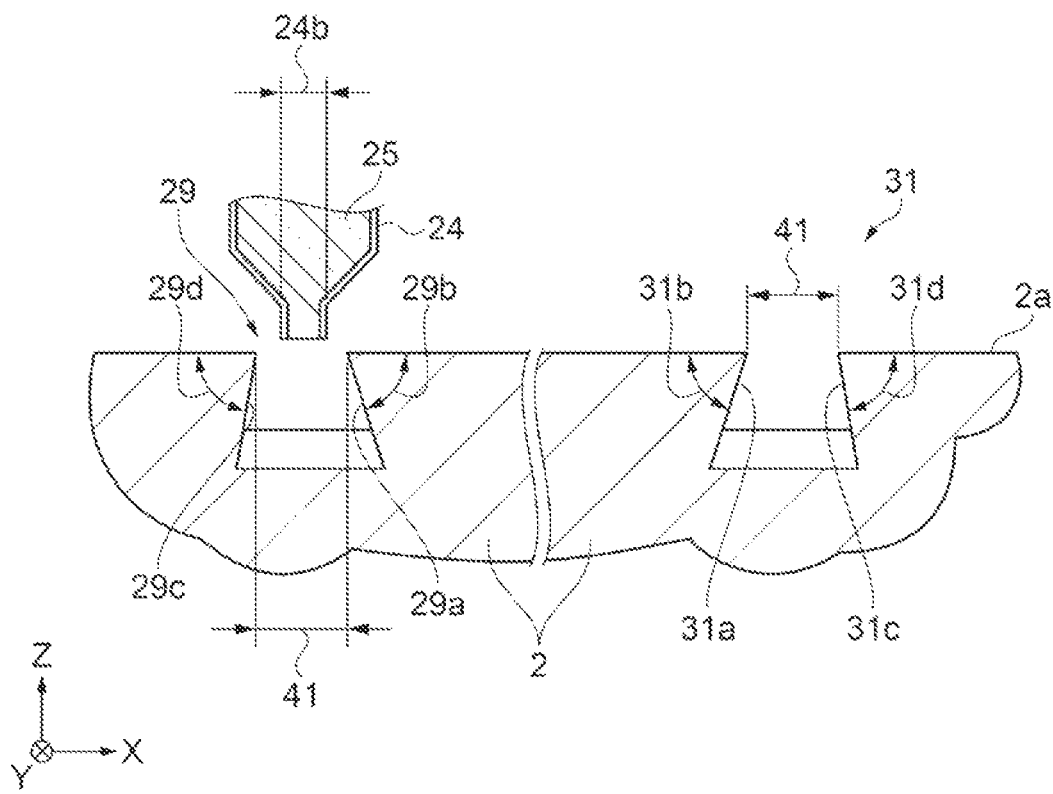
FIG. 3 is a schematic side sectional view of a main part of the stage.

As shown in FIG. 3, cross-sectional shapes of the first groove 29 and the second groove 31 are trapezoidal. Cross-sectional shapes of the third groove 32 to the tenth groove 39 are also trapezoidal. A first angle 29b, which is an angle formed by the shaping surface 2a and a first side wall 29a that is a side wall of the first groove 29 on a second groove 31 side, is 70 degrees or more and less than 90 degrees. A third angle 29d, which is an angle formed by the shaping surface 2a and a third side wall 29c of the first groove 29 facing the first side wall 29a, is preferably larger than the first angle 29b. This can prevent warp of the sacrificial layer 10.

A second angle 31b, which is an angle formed by the shaping surface 2a and a second side wall 31a that is a side wall of the second groove 31 on a side closer to the first groove 29, is 70 degrees or more and less than 90 degrees. A fourth angle 31d, which is an angle formed by the shaping surface 2a and a fourth side wall 31c of the second groove 31 facing the second side wall 31a, is preferably larger than the second angle 31b. This can prevent warp of the sacrificial layer 10.

A groove width 41, which is a width of the first groove 29 or a width of the second groove 31, is wider than a nozzle outer diameter 24b, which is an outer diameter of the nozzle 24. According to this configuration, the groove widths 41 of the first groove 29 and the second groove 31 are wider than the nozzle outer diameter 24b of the nozzle 24. Therefore, the shaping material 3 discharged from the nozzle 24 can be easily charged into the first groove 29 and the second groove 31. The groove width 41 is not particularly limited, but is 0.1 mm to 0.5 mm. The groove width 41 of the first groove 29 is a distance between an intersection line of the shaping surface 2a and the first side wall 29a and an intersection line of the shaping surface 2a and the third side wall 29c.

Figure 4:
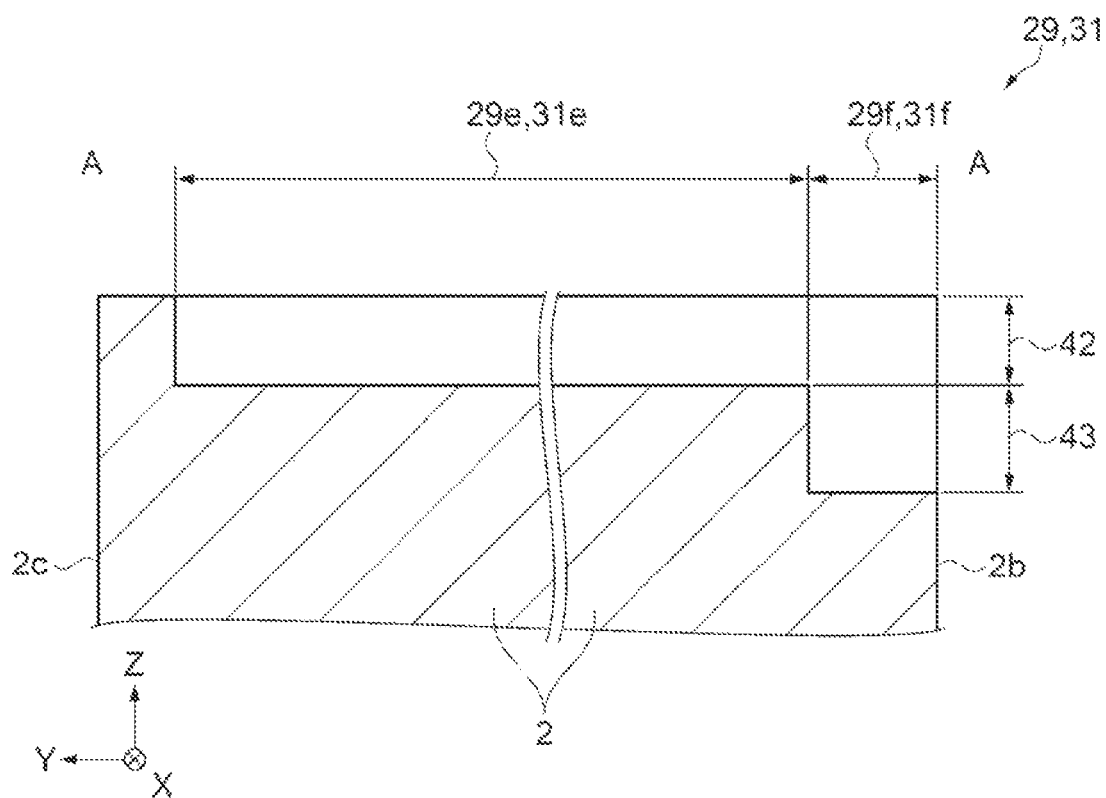
FIG. 4 is a schematic side sectional view of a main part of the stage.

FIG. 4 is a view as viewed from a cross-sectional side taken along a line AA of FIG. 2. FIG. 4 is also a view as viewed from a cross-sectional side taken along a line BB of FIG. 2. As shown in FIG. 4, the cross-sectional shape of the first groove 29 is the same as the cross-sectional shape of the second groove 31. The first groove 29 includes a first shallow groove portion 29e and a first deep groove portion 29f. The second groove 31 includes a second shallow groove portion 31e and a second deep groove portion 31f.

Most portion of the first groove 29 is the first shallow groove portion 29e. A depth of the first groove 29 indicates a depth of the first shallow groove portion 29e. Most portion of the second groove 31 is the second shallow groove portion 31e. A depth of the second groove 31 indicates a depth of the second shallow groove portion 31e.

A shallow groove depth 42, which indicates the depth of the first shallow groove portion 29e indicating the depth of the first groove 29 and the depth of the second shallow groove portion 31e indicating the depth of the second groove 31, is 0.2 mm or more and 1 mm or less. A deep groove depth 43, which indicates the depths of the first deep groove portion 29f and the second deep groove portion 31f with respect to the first shallow groove portion 29e and the second shallow groove portion 31e, is 0.5 mm. Lengths of the first deep groove portion 29f and the second deep groove portion 31f in the Y direction are not particularly limited, but are preferably 0.2 mm or more and 2 mm or less.

The cross-sectional shapes of the third groove 32, the fifth groove 34, the seventh groove 36, and the ninth groove 38 as viewed from the negative Y side are the same as that of the first groove 29. The cross-sectional shapes of the fourth groove 33, the sixth groove 35, the eighth groove 37, and the tenth groove 39 as viewed from the negative Y side are the same as that of the second groove 31. The first groove 29 and the second groove 31 have a mirror-image symmetrical relationship.

Next, a method for manufacturing the shaped object 20 using the three-dimensional shaping device 1 will be described. In a flowchart of FIG. 5, step S1 is an alignment step. In step S1, alignment between the stage 2 and the nozzle 24 is performed. The stage 2 is provided with a height detection sensor, and the movement mechanism 7 moves the stage 2 with respect to the nozzle 24. The height detection sensor is disposed immediately below the nozzle 24. The movement mechanism 7 reduces a distance between the nozzle 24 and the stage 2 in the Z direction. A position where the height detection sensor detects contact with the discharge unit 13 is set as a reference point of the stage 2 in the Z direction.

The movement mechanism 7 includes an X side surface sensor that detects a side surface of the stage 2 on a negative X side. Further, the movement mechanism 7 includes a Y side surface sensor that detects a side surface of the stage 2 on a negative Y side. The side surface on the negative X side and the side surface on the negative Y side of the stage 2 are formed with an accurate perpendicularity. In the stage 2, the side surface on the negative X side and the side surface on the negative Y side are reference surfaces. The X side surface sensor and the Y side surface sensor detect a corner portion where the side surface on the negative X side and the side surface on the negative Y side intersect with each other and use the corner portion as a reference point in a plane direction. The X side surface sensor and the Y side surface sensor detect a rotational deviation of the stage 2 about the Z direction as an axis. The control unit 4 calculates a position of the stage 2 with respect to the base 6. In the stage 2, the first groove 29 to the tenth groove 39 are formed with high positional accuracy with respect to the reference surfaces of the side surfaces and the reference point.

A relative positional relationship between the base 6 and the nozzle 24 is measured in advance. Based on the reference point of the stage 2, the control unit 4 calculates coordinates of the first groove 29 to the tenth groove 39, the sacrificial layer 10, and the shaped object 20. Next, the control unit 4 generates data of a movement path of the nozzle 24. Next, the process proceeds to step S2.

Step S2 is a girder layer forming step. In step S2, the three-dimensional shaping device 1 forms a first girder layer 44 in the first groove 29 and forms a second girder layer 45 in the second groove 31. The movement mechanism 7 moves the nozzle 24 along the Y direction based on the movement path. The nozzle 24 supplies the shaping material 3 to the first groove 29 and the second groove 31 to form the first girder layer 44 and the second girder layer 45. The nozzle 24 and the shaping surface 2a have a predetermined distance while the first girder layer 44 and the second girder layer 45 are being formed. Surfaces of the formed first girder layer 44 and second girder layer 45 protrude in the positive Z direction from the shaping surface 2a. This can prevent the tip end of the nozzle 24 from coming into contact with the stage 2 when the nozzle 24 discharges the shaping material 3. Next, the process proceeds to step S3.

Step S3 is a sacrificial layer forming step. In step S3, the three-dimensional shaping device 1 forms the sacrificial layer 10. The movement mechanism 7 moves the nozzle 24 along the X direction based on the movement path. At this time, the nozzle 24 supplies the shaping material 3 onto the shaping surface 2a to form the sacrificial layer 10. The sacrificial layer 10 includes a first floor layer to a fourth floor layer. The first floor layer formed immediately above the first girder layer 44 and the second girder layer 45 is formed while being pressed by the nozzle 24. Therefore, adhesion between the first girder layer 44, the second girder layer 45 and the first floor layer is improved. A surface of the first floor layer on the positive Z side is flat.

The movement path of the nozzle 24 when the first floor layer is formed may be in any direction intersecting with the Y direction on an XY plane, and is preferably formed along the X direction, which is orthogonal to the Y direction. At this time, an effective area of the sacrificial layer 10 in which the shaped object 20 can be formed can be increased. The shaping material 3 on the shaping surface 2a supplied from the nozzle 24 is a linear portion.

The linear portion shrinks when cooled. The first floor layer has a high thermal shrinkage rate with respect to a direction in which the linear portion is formed. The first girder layer 44 of the first groove 29 and the second girder layer 45 of the second groove 31 are biased in a direction approaching each other by the first floor layer. Therefore, the girder layers can improve the adhesion between the first groove 29 and the second groove 31.

The second floor layer, the third floor layer, and the fourth floor layer are laminated on the first floor layer. The movement path of the nozzle 24 when each floor layer is formed may be any direction intersecting with the Y direction on the XY plane. Next, the process proceeds to step S4.

Step S4 is a shaping layer forming step. In step S4, the three-dimensional shaping device 1 laminates shaping layers to form the shaped object 20. The movement mechanism 7 moves the nozzle 24 based on the set movement path. The nozzle 24 supplies the shaping material 3 in a superimposed manner to laminate the shaping layers. Next, the process proceeds to step S5.

Step S5 is a shaped object removing step. After the three-dimensional shaping device 1 finishes forming the shaped object 20, an operator moves the sacrificial layer 10 along the first direction 28. Since the first groove 29 and the second groove 31 open in the first direction 28, the sacrificial layer 10 is removed from the stage 2. Accordingly, the sacrificial layer 10 and the stage 2 can be separated from each other without applying a large force to the shaped object 20.

The stage 2 may include a heater. When the three-dimensional shaping device 1 finishes forming the shaped object 20, the control unit 4 and the temperature control unit 8 cause the heater to heat the first floor layer to the fourth floor layer. The heated first floor layer to the fourth floor layer thermally expand, and the adhesion between the first girder layer 44 and the first groove 29 and between the second girder layer 45 and the second groove 31 can be primarily weakened.

The sacrificial layer 10 is subjected to secondary processing such as milling. The shaped object 20 and the sacrificial layer 10 are separated from each other, and the shaped object 20 is completed.

Figure 5:
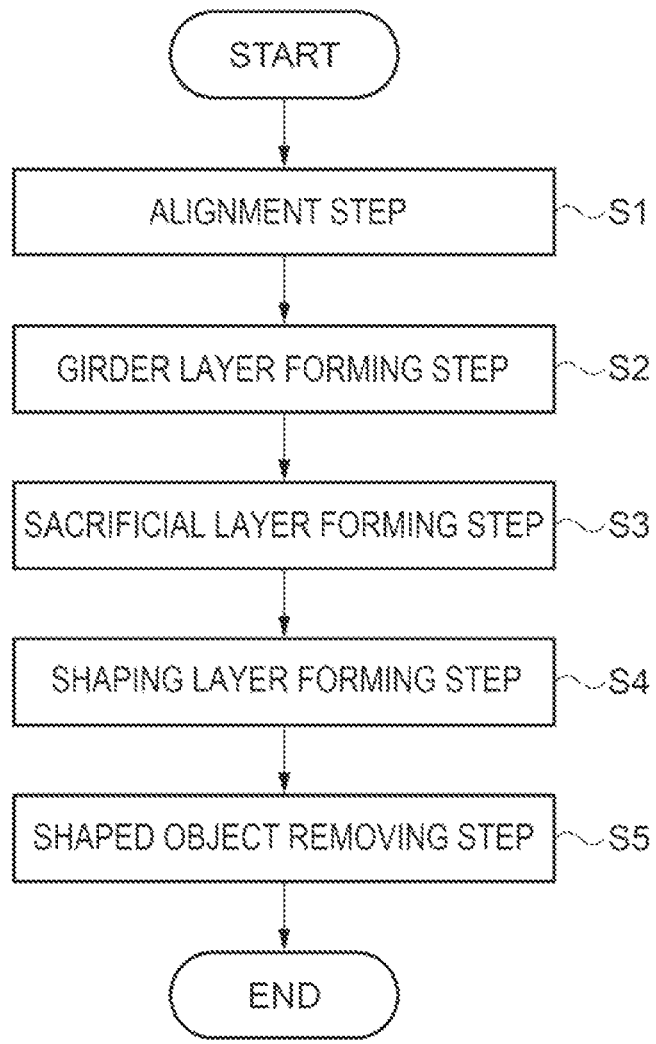
FIG. 5 is a flowchart for generating a shaped object.

Next, a method for manufacturing the shaped object 20 will be described in detail in correspondence with the steps shown in FIG. 5.

Figure 6:
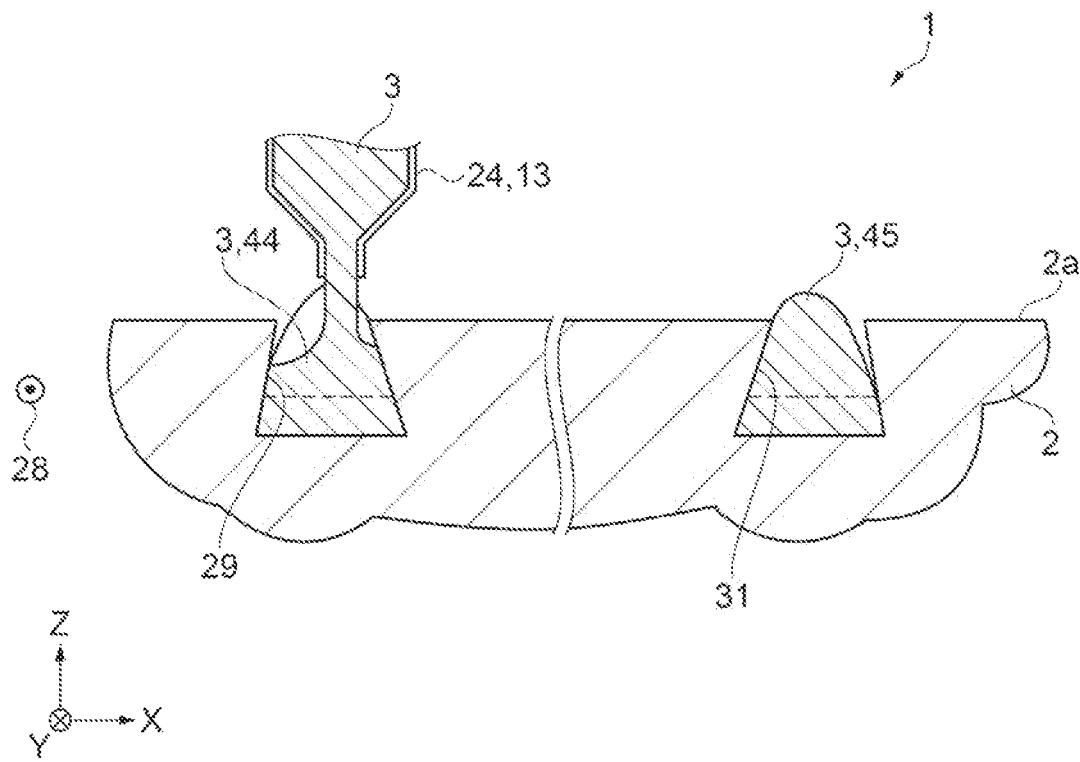
FIG. 6 is a schematic diagram showing a method of generating a shaped object.
Figure 7:
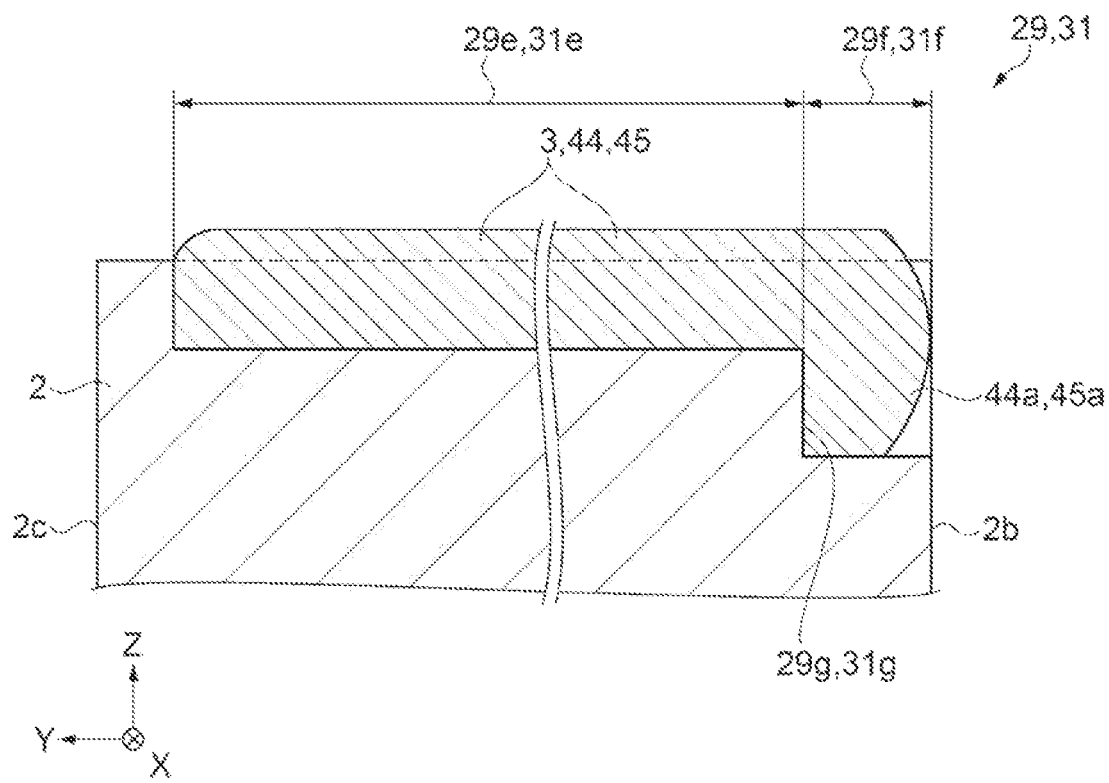
FIG. 7 is a schematic diagram showing the method for generating a shaped object.
Figure 8:
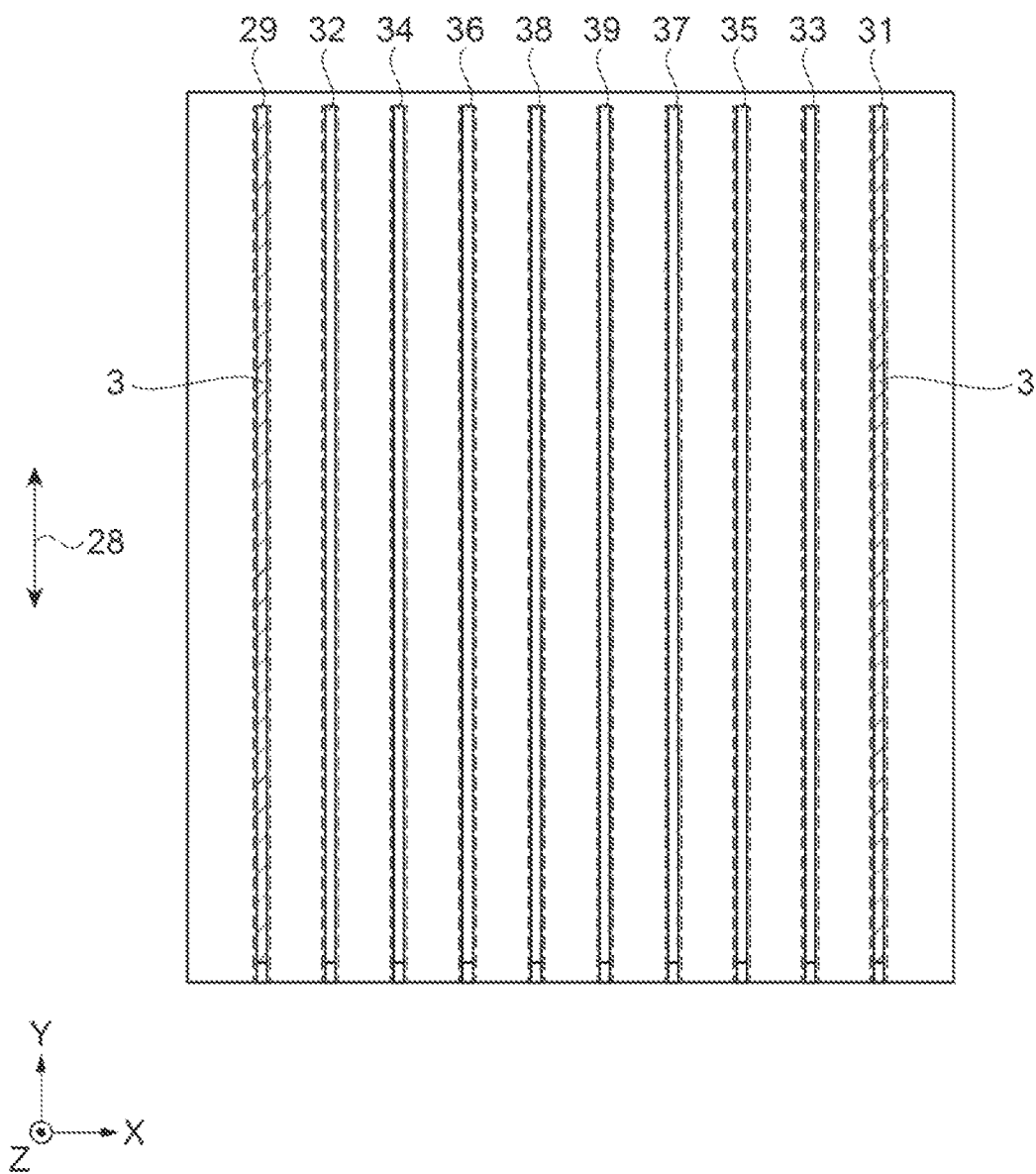
FIG. 8 is a schematic diagram showing the method for generating a shaped object.

FIGS. 6 to 8 are diagrams corresponding to the girder layer forming step of step S2. As shown in FIG. 6, in step S2, the control unit 4 forms the first girder layer 44 by supplying the shaping material 3 to the first groove 29 while relatively moving the nozzle 24 of the discharge unit 13 in the first direction 28 with respect to the stage 2. Next, the control unit 4 forms the second girder layer 45 by supplying the shaping material 3 to the second groove 31 while relatively moving the nozzle 24 of the discharge unit 13 in the first direction 28 with respect to the stage 2. An order for forming the first girder layer 44 and the second girder layer 45 is not limited. The first direction 28 for moving the nozzle 24 is not limited to the positive Y direction and the negative Y direction. In the present embodiment, for example, a direction for moving the nozzle 24 when the shaping material 3 is supplied is the positive Y direction.

The first girder layer 44 is formed on a side closer to the second groove 31 in the first groove 29. The second girder layer 45 is formed on the side closer to the first groove 29 in the second groove 31. A height at which the first girder layer 44 and the second girder layer 45 protrude from the shaping surface 2a is not particularly limited, but in the present embodiment, for example, the height is 0.2 mm.

As shown in FIG. 7, the shaping material 3 hangs down in the negative Z direction in the first deep groove portion 29f and the second deep groove portion 31f as compared with the shaping material 3 of the first shallow groove portion 29e and the second shallow groove portion 31e. In the first groove 29, since the shaping material 3 is hooked by a first step side surface 29g, the shaping material 3 is prevented from moving in the positive Y direction. In the second groove 31, since the shaping material 3 is hooked by a second step side surface 31g, the shaping material 3 is prevented from moving in the positive Y direction. In the first deep groove portion 29f, the shaping material 3 hanging down in the negative Z direction is a first protrusion 44a. In the second deep groove portion 31f, the shaping material 3 hanging down in the negative Z direction is a second protrusion 45a.

As shown in FIG. 8, the shaping material 3 is supplied to the first groove 29 and the second groove 31. In FIG. 8, a place in which the shaping material 3 is supplied is hatched. At this time, the sacrificial layer 10 is formed from the first groove 29 to the second groove 31. When the sacrificial layer 10 is to be formed from the third groove 32 to the fourth groove 33, the shaping material 3 is supplied to the third groove 32 and the fourth groove 33. When the sacrificial layer 10 is to be formed from the fifth groove 34 to the sixth groove 35, the shaping material 3 is supplied to the fifth groove 34 and the sixth groove 35. When the sacrificial layer 10 is to be formed from the seventh groove 36 to the eighth groove 37, the shaping material 3 is supplied to the seventh groove 36 and the eighth groove 37. When the sacrificial layer 10 is to be formed from the ninth groove 38 to the tenth groove 39, the shaping material 3 is supplied to the ninth groove 38 and the tenth groove 39.

According to this configuration, since the depth of the first groove 29 is 0.2 mm or more, the first girder layer 44 can be prevented from being detached from the first groove 29. Since the depth of the second groove 31 is also 0.2 mm or more, the second girder layer 45 can be prevented from being detached from the second groove 31. Since the depth of the first groove 29 and the depth of the second groove 31 are 1 mm or less, a thickness of the stage 2 can be reduced. Effects are obtained when all conditions of the first angle 29b, the second angle 31b, and the shallow groove depth 42 fall within the above ranges.

Figure 9:
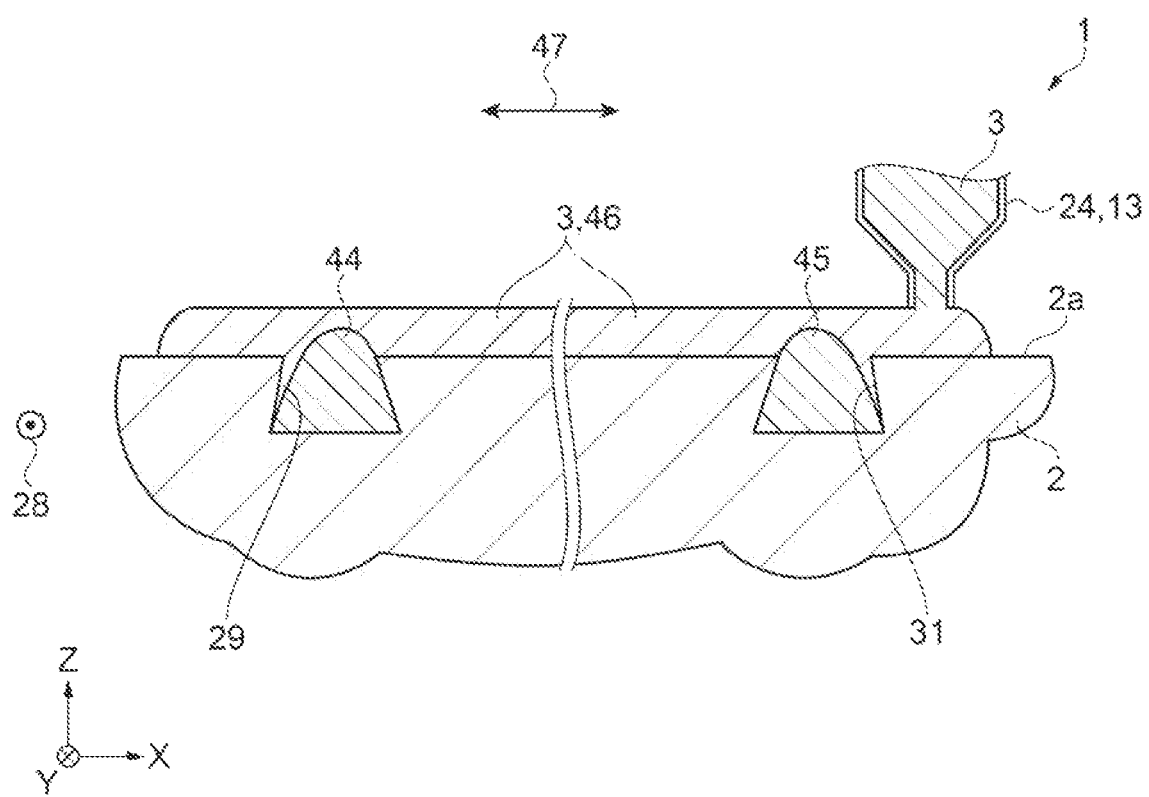
FIG. 9 is a schematic diagram showing the method for generating a shaped object.

FIGS. 9 to 12 are diagrams corresponding to the sacrificial layer forming step of step S3. As shown in FIG. 9, in step S3, the control unit 4 controls the movement mechanism 7 and the discharge unit 13 to form the first floor layer 46 which couples the first girder layer 44 and the second girder layer 45 by supplying the shaping material 3 onto the shaping surface 2a while relatively moving the nozzle 24 of the discharge unit 13 with respect to the stage 2.

The shaping material 3 supplied in step S2 and the shaping material 3 supplied in step S3 are preferably made of the same material. This can improve the adhesion between the first girder layer 44 and the second girder layer 45 and the first floor layer 46. A type of the shaping material 3 is not particularly limited, but in the present embodiment, for example, an ABS resin is used as the shaping material 3. A resin having a high shrinkage rate, such as polyethylene, can also be used.

According to this configuration, the shaping material 3 is supplied onto the shaping surface 2a. The shaping material 3 shrinks when cooled. The first girder layer 44 shrinks with respect to the first groove 29. The second girder layer 45 similarly shrinks with respect to the second groove 31. At this time, the first floor layer 46 coupling the first girder layer 44 and the second girder layer 45 shrinks. The first floor layer 46 biases the first girder layer 44 and the second girder layer 45 such that the first girder layer 44 and the second girder layer 45 approach each other. Then, the first girder layer 44 presses the first groove 29 toward the second groove 31. The second girder layer 45 presses the second groove 31 toward the first groove 29. Therefore, even when the shaping material 3 shrinks, the shaped object 20 formed on the shaping surface 2a can maintain the positional relationship with the stage 2.

Figure 10:
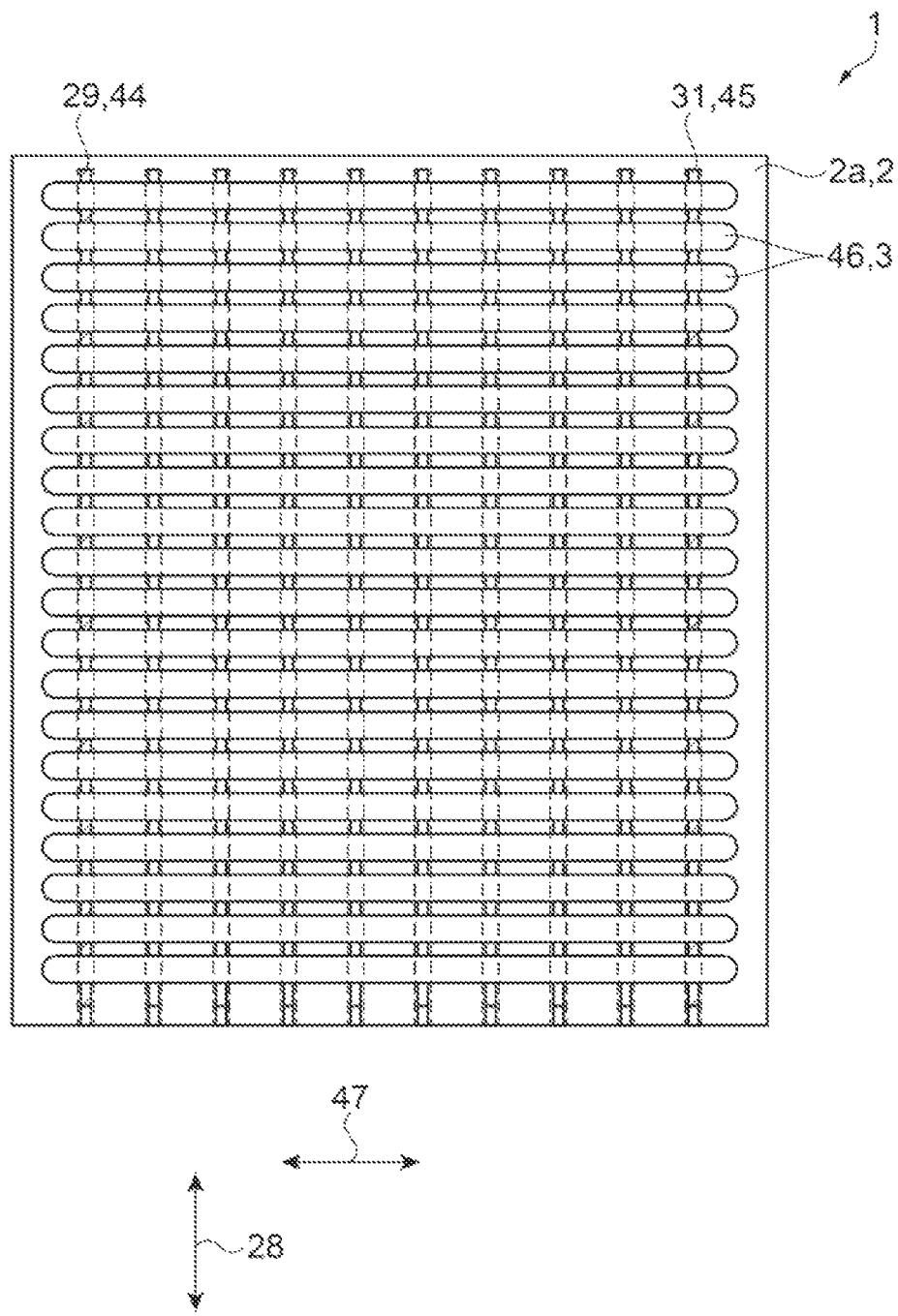
FIG. 10 is a schematic diagram showing the method for generating a shaped object.

As shown in FIG. 10, the first girder layer 44 and the second girder layer 45 extend in the first direction 28. The first floor layer 46 is formed by supplying the shaping material 3 onto the stage 2 while the control unit 4 causes the nozzle 24 of the discharge unit 13 to reciprocate in a second direction 47 that intersects with the first direction 28. The second direction 47 is not limited to the direction orthogonal to the first direction 28. The second direction 47 is preferably the direction orthogonal to the first direction 28. This can increase an area of the sacrificial layer 10 in a plan view as viewed from the Z direction.

A route for moving the nozzle 24 moving when the first floor layer 46 is formed is not particularly limited. In the present embodiment, for example, in the second direction 47, the nozzle 24 advances alternately in the positive X direction and the negative X direction. In the first direction 28, the first floor layer 46 is sequentially formed from the positive Y side toward the negative Y direction.

Shaping conditions when the first floor layer 46 is formed are not particularly limited. In the present embodiment, for example, an area occupied by the shaping material 3 per unit area of the first floor layer 46 is 5%. The area occupied by the shaping material 3 per unit area is also referred to as an infill rate.

According to this configuration, in order to form the first floor layer 46, the nozzle 24 of the discharge unit 13 supplies the shaping material 3 onto the shaping surface 2a while moving in the second direction 47 which intersects with the first direction 28. At this time, the first floor layer 46 in which the supplied shaping material 3 is solidified has a characteristic of having high strength in the second direction 47, which is a moving direction of the discharge unit 13. When the discharge unit 13 repeatedly reciprocates to increase the width of the first floor layer 46, the strength of the first floor layer 46 is weak in the first direction 28, which is perpendicular to the moving direction of the discharge unit 13. The moving direction of the discharge unit 13 is a direction from the first girder layer 44 toward the second girder layer 45, and is a direction from the second girder layer 45 toward the first girder layer 44. When the shaping material 3 is cooled and shrinks, tension acts in the direction from the first girder layer 44 to the second girder layer 45 and in the direction from the second girder layer 45 to the first girder layer 44. Therefore, the tension acts on the first floor layer 46 in the moving direction of the discharge unit 13, which can prevent the first floor layer 46 from being broken even when the shaping material 3 shrinks.

According to this configuration, the first girder layer 44 is formed on the side closer to the second groove 31 in the first groove 29. When the first floor layer 46 shrinks due to the cooling, the first girder layer 44 is pressed toward the second groove 31 in the first groove 29. Therefore, a frictional force between the first groove 29 and the first girder layer 44 can be increased. Similarly, the second girder layer 45 is formed on the side closer to the first groove 29 in the second groove 31. When the first floor layer 46 shrinks due to the cooling, the second girder layer 45 is pressed toward the first groove 29 in the second groove 31. Therefore, the frictional force between the second groove 31 and the second girder layer 45 can be increased.

According to this configuration, the angle formed by the first side wall 29a and the shaping surface 2a is less than 90 degrees. Therefore, when the first girder layer 44 is pulled toward the second groove 31, the first girder layer 44 is pressed toward a bottom surface of the first groove 29. Similarly, the angle formed by the second side wall 31a and the shaping surface 2a is less than 90 degrees. Therefore, when the second girder layer 45 is pulled toward the first groove 29, the second girder layer 45 is pressed toward a bottom surface of the second groove 31. Therefore, it is possible to make the first floor layer 46 less likely to be separated from the shaping surface 2a.

The first angle 29b formed by the first side wall 29a and the shaping surface 2a is 70 degrees or more. Therefore, the first girder layer 44 can be separated from the first groove 29 by human power. The second angle 31b formed by the second side wall 31a and the shaping surface 2a is also 70 degrees or more. Therefore, the second girder layer 45 can be separated from the second groove 31 by human power. Therefore, the first floor layer 46 can be separated from the shaping surface 2a by human power.

Figure 11:
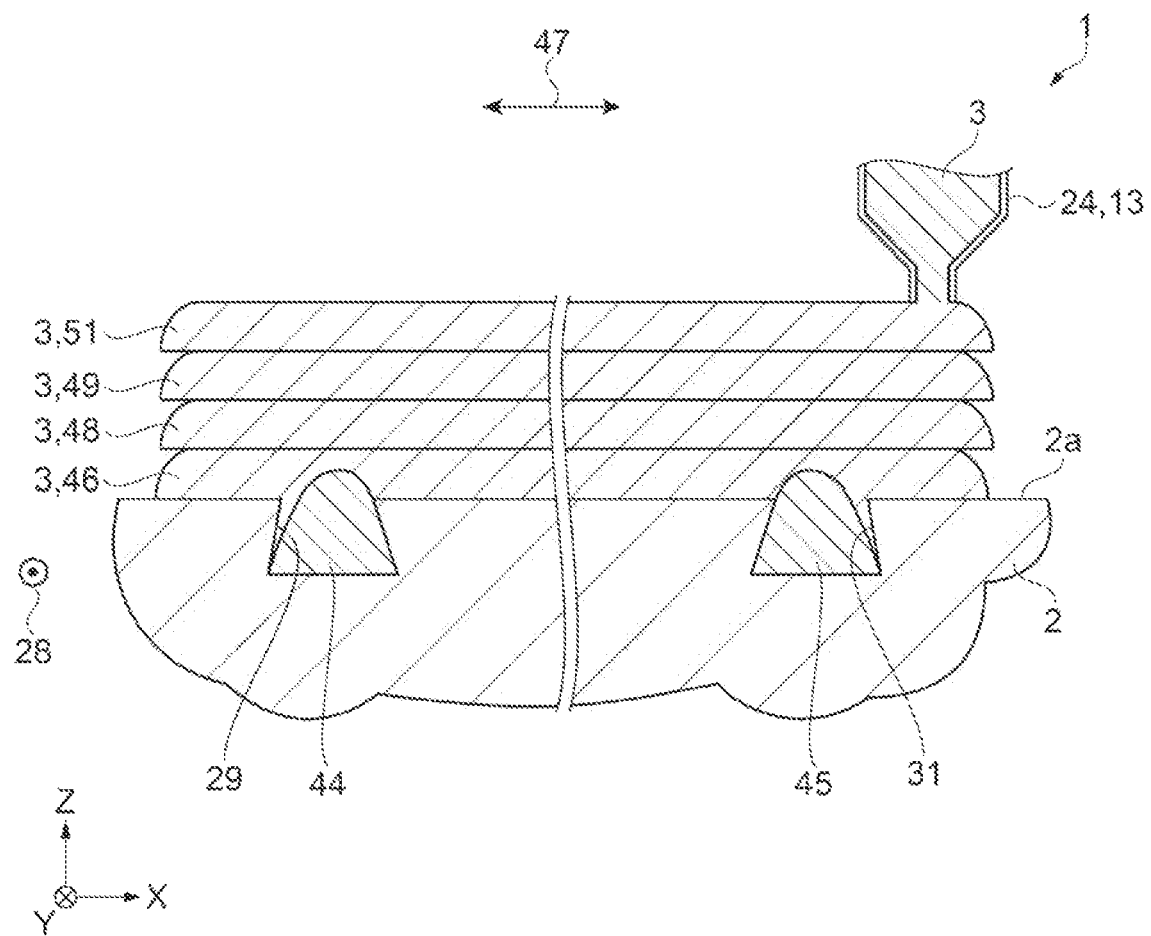
FIG. 11 is a schematic diagram showing the method for generating a shaped object.

As shown in FIG. 11, a second floor layer 48 is formed by supplying the shaping material 3 onto the first floor layer 46 while the nozzle 24 of the discharge unit 13 reciprocates in the second direction 47 which intersects with the first direction 28. An area occupied by the shaping material 3 per unit area of the second floor layer 48 is larger than the area occupied by the shaping material 3 per unit area of the first floor layer 46.

According to this configuration, the second floor layer 48 is laminated on the first floor layer 46. Since the area occupied by the shaping material 3 per unit area of the second floor layer 48 is larger than that of the first floor layer 46, the second floor layer 48 has a surface with slighter unevenness. Therefore, a surface roughness of the second floor layer 48 can be reduced as compared with the first floor layer 46.

For example, in the present embodiment, the area occupied by the shaping material 3 per unit area of the first floor layer 46 is 5%. The area occupied by the shaping material 3 per unit area of the second floor layer 48 is 75%.

A third floor layer 49 is formed by supplying the shaping material 3 onto the second floor layer 48 while the nozzle 24 reciprocates in the second direction 47. Further, a fourth floor layer 51 is formed by supplying the shaping material 3 onto the third floor layer 49 while the nozzle 24 reciprocates in the second direction 47.

For example, in the present embodiment, an area occupied by the shaping material 3 per unit area of the third floor layer 49 and the fourth floor layer 51 is 85%. The area occupied by the shaping material 3 per unit area of the third floor layer 49 and the fourth floor layer 51 is larger than that of the second floor layer 48. Therefore, a surface roughness of the fourth floor layer 51 is smaller than the surface roughness of the second floor layer 48. Accordingly, the area occupied by the shaping material 3 per unit area of an upper layer is preferably larger than the area occupied by the shaping material 3 per unit area of a lower layer. This can reduce the surface roughness of the upper layer.

Figure 12:
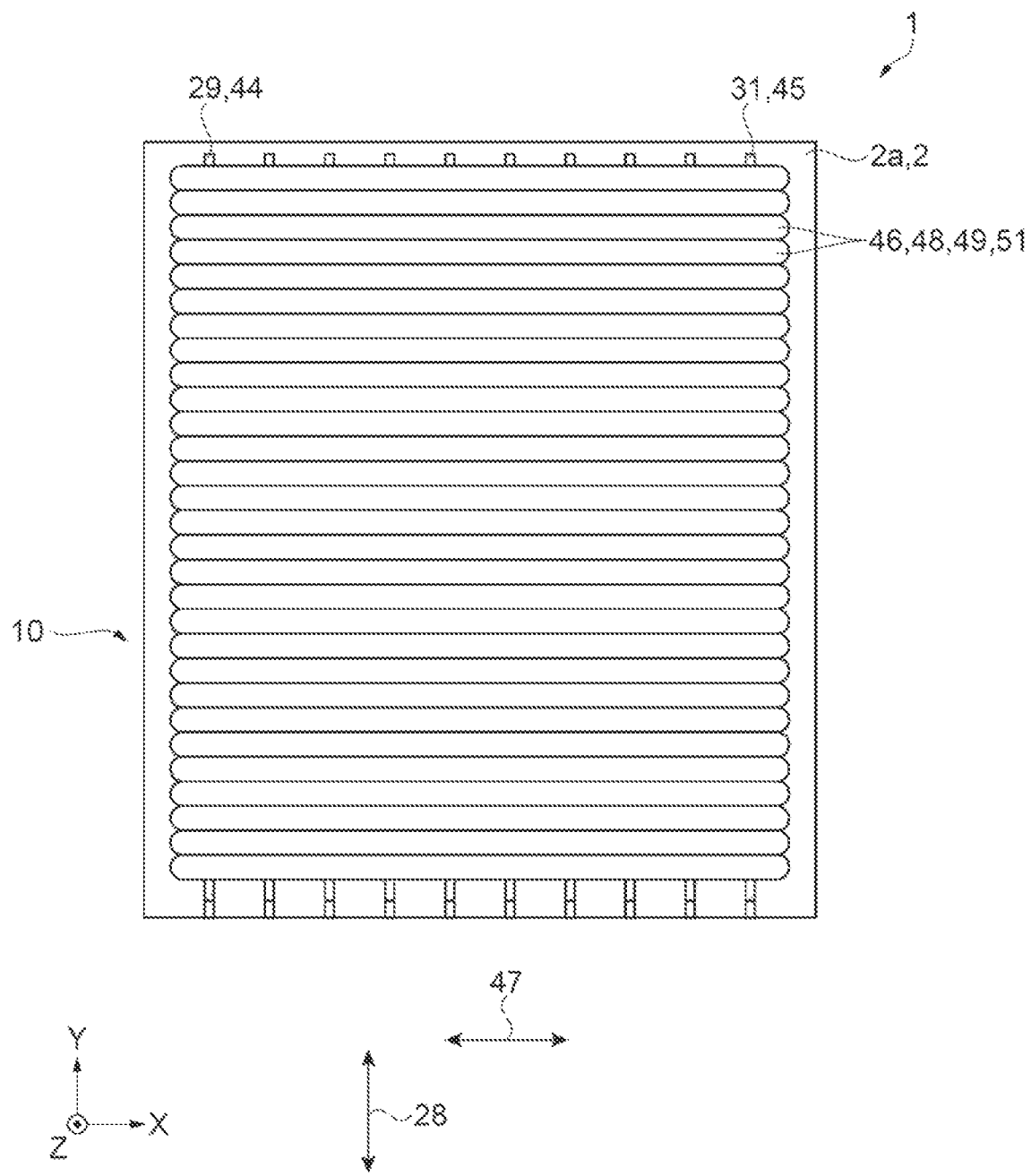
FIG. 12 is a schematic diagram showing the method for generating a shaped object.

As shown in FIG. 12, in the second direction 47, the first floor layer 46, the second floor layer 48, the third floor layer 49, and the fourth floor layer 51 are arranged between the first girder layer 44 and the second girder layer 45. In step S2, when changing to another groove to supply the shaping material 3, the first floor layer 46, the second floor layer 48, the third floor layer 49, and the fourth floor layer 51 are arranged between the two grooves supplied with the shaping material 3. In step S3, the sacrificial layer 10 is completed.

Shaping conditions when the sacrificial layer 10 is formed are not particularly limited. In the present embodiment, for example, a shaping speed is 100 mm/s. A lamination pitch is, for example, 0.1 mm to 0.2 mm.

Figure 13:
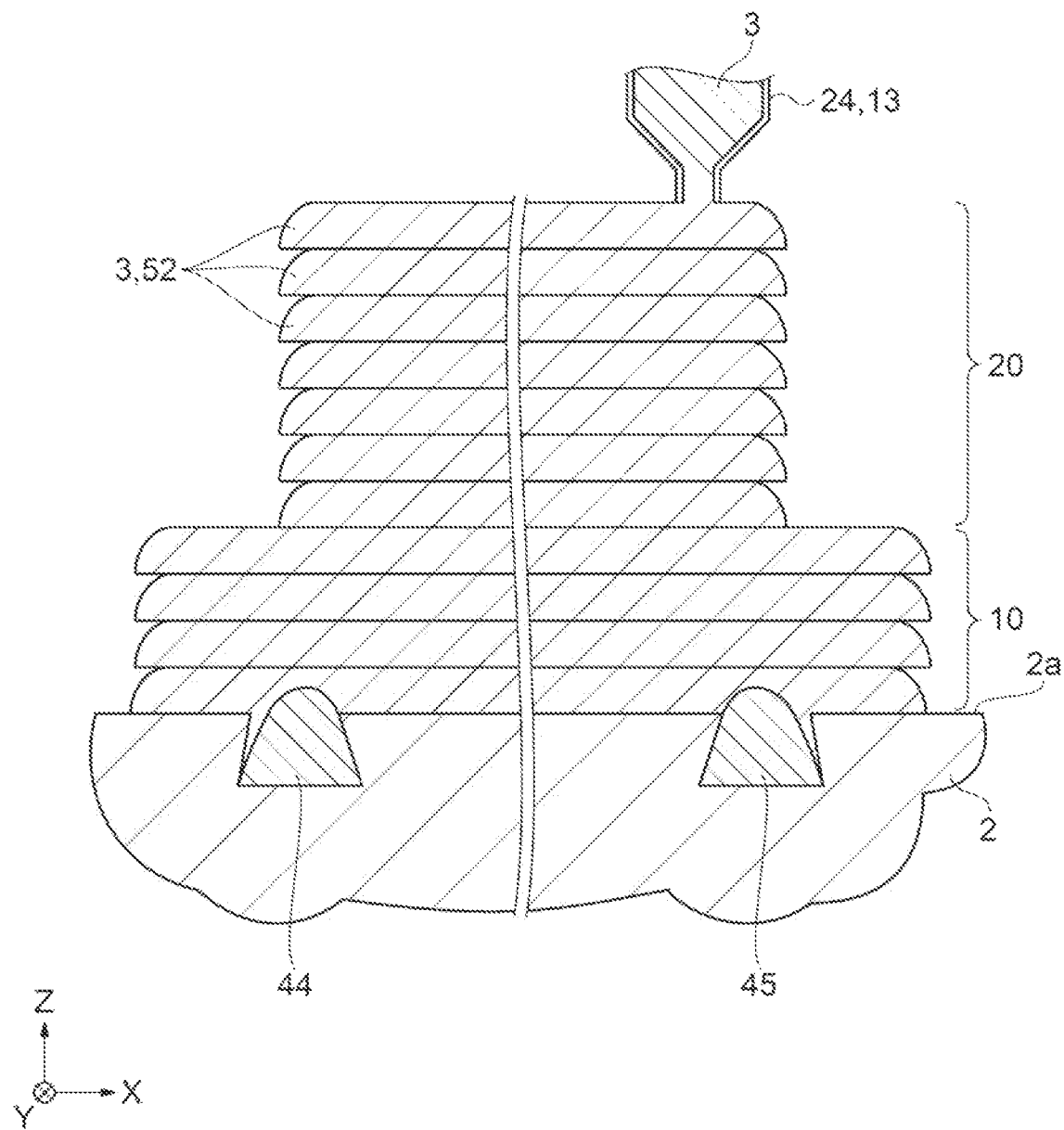
FIG. 13 is a schematic diagram showing the method for generating a shaped object.

FIG. 13 is a diagram corresponding to the shaping layer forming step of step S4. As shown in FIG. 13, in step S4, the shaping material 3 is supplied onto the sacrificial layer 10 to form shaping layers 52. A plurality of the shaping layers 52 are laminated to form the shaped object 20.

Figure 14:
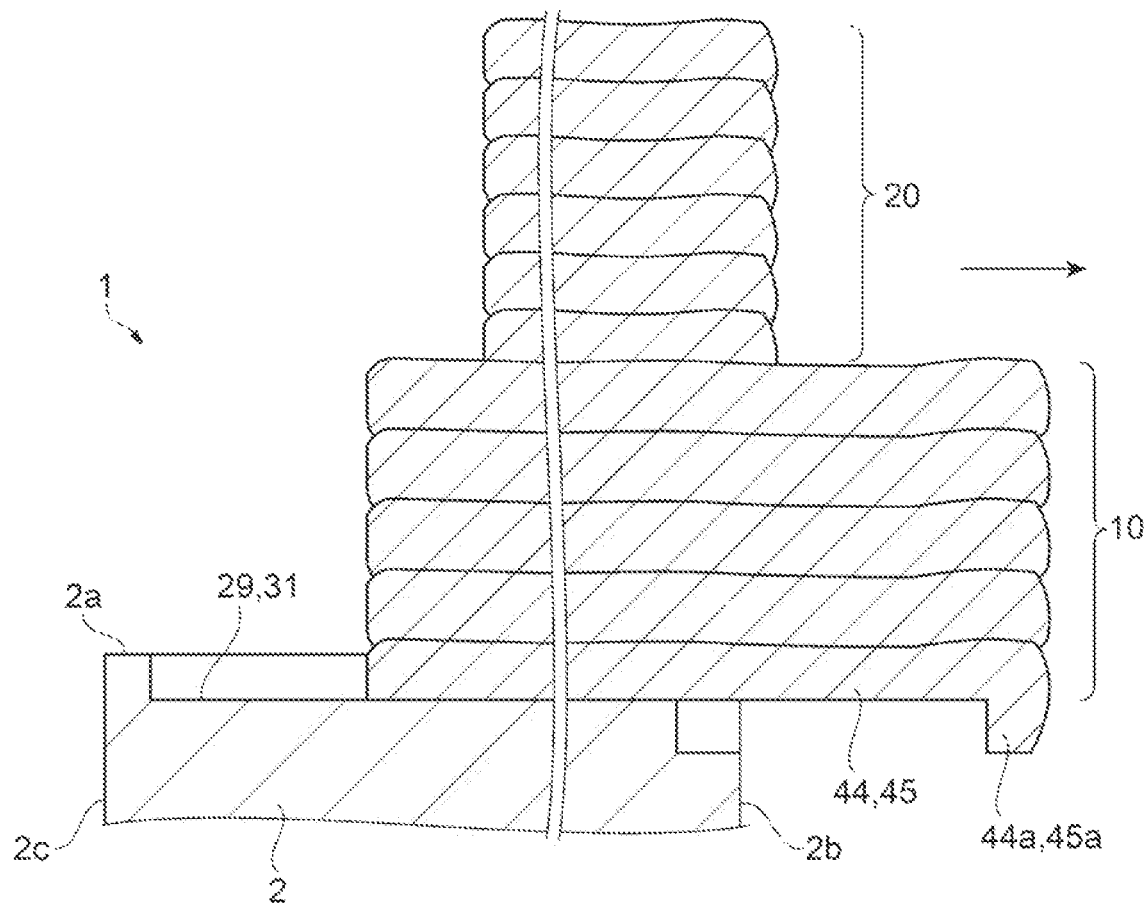
FIG. 14 is a schematic diagram showing the method for generating a shaped object.

FIG. 14 is a diagram corresponding to the shaped object removing step in step S5. As shown in FIG. 14, in step S5, the operator moves the shaped object 20 in the negative Y direction. The first girder layer 44 moves along the first groove 29. The second girder layer 45 moves along the second groove 31. The sacrificial layer 10 can be easily moved by causing the heater provided in the stage 2 to heat. Since the first groove 29 and the second groove 31 open on the first side surface 2b, the first girder layer 44 and the second girder layer 45 can be drawn out in the negative Y direction.

When the first girder layer 44 is detached from the first groove 29 by about 80%, the operator rotates the sacrificial layer 10 with the X direction as an axis. The sacrificial layer 10 on the positive Y side is lifted in the positive Z direction, and the first girder layer 44 and the second girder layer 45 are removed from the first groove 29 and the second groove 31, respectively. Accordingly, the shaped object 20 is removed from the stage 2. Next, the shaped object 20 is separated from the sacrificial layer 10, and the shaped object 20 is completed.

Second Embodiment

The present embodiment is different from the first embodiment in that the first groove 29 shown in FIG. 4 is not provided with the first deep groove portion 29f and the first groove 29 is implemented with the first shallow groove portion 29e. The same components as those according to the first embodiment are denoted by the same reference numerals, and redundant description thereof will be omitted.

Figure 15:
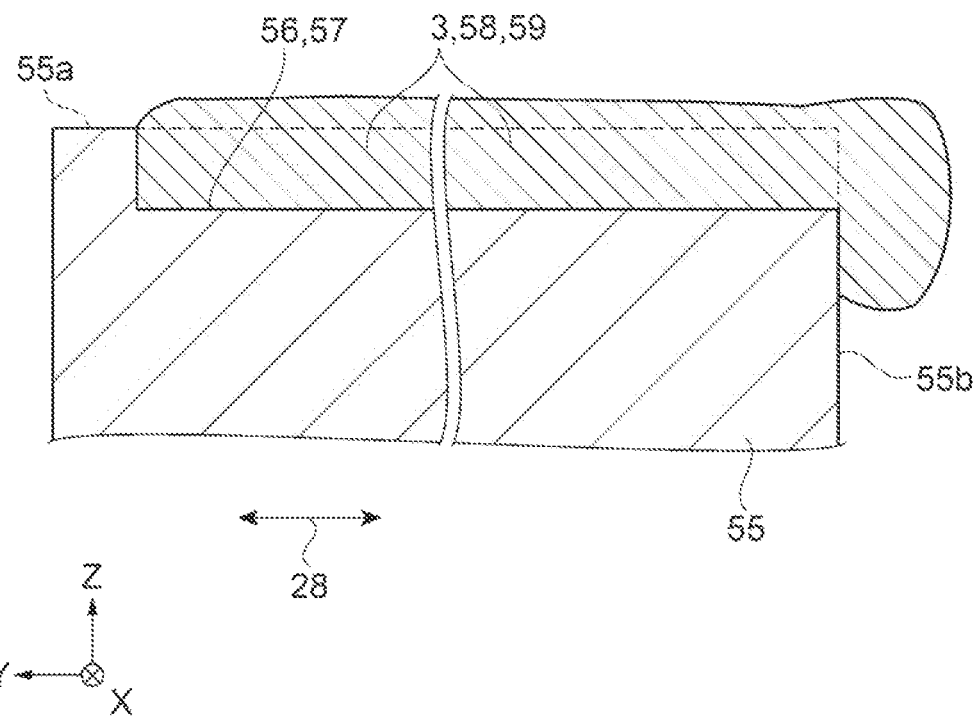
FIG. 15 is a schematic side sectional view of a main part of a stage according to a second embodiment.

As shown in FIG. 15, a shaping surface 55a of a stage 55 has a first groove 56 and a second groove 57. The stage 55 has a first side surface 55b that intersects with the shaping surface 55a on the negative Y side. One end of the first groove 56 opens on the first side surface 55b. One end of the second groove 57 opens on the first side surface 55b. The first side surface 55b is one surface of the stage 55 in the first direction 28.

According to this configuration, when the shaping material 3 is supplied to the first groove 56 beyond the one end of the first groove 56, a part of the shaping material 3 flows in the direction of gravity and hangs down. The first girder layer 58 has a shape that hangs down along the first side surface 55b. Similarly, when the shaping material 3 is supplied to the second groove 57, a part of the shaping material 3 flows and hangs down on the first side surface 55b. A second girder layer 59 has a shape that hangs down along the first side surface 55b. Therefore, it is possible to further prevent movement of the first floor layer 46 to a side opposite to the first side surface 55b of the stage 55.

Since the first groove 56 and the second groove 57 open on the first side surface 55b, the first girder layer 58 and the second girder layer 59 can be moved in the negative Y direction in the shaped object removing step of step S5. Therefore, the sacrificial layer 10 can be easily removed from the stage 55.

Third Embodiment

The present embodiment is different from the first embodiment in that the first groove 29 and the second groove 31 shown in FIG. 4 do not open on the first side surface 2b. The same components as those according to the first embodiment are denoted by the same reference numerals, and redundant description thereof will be omitted.

Figure 16:
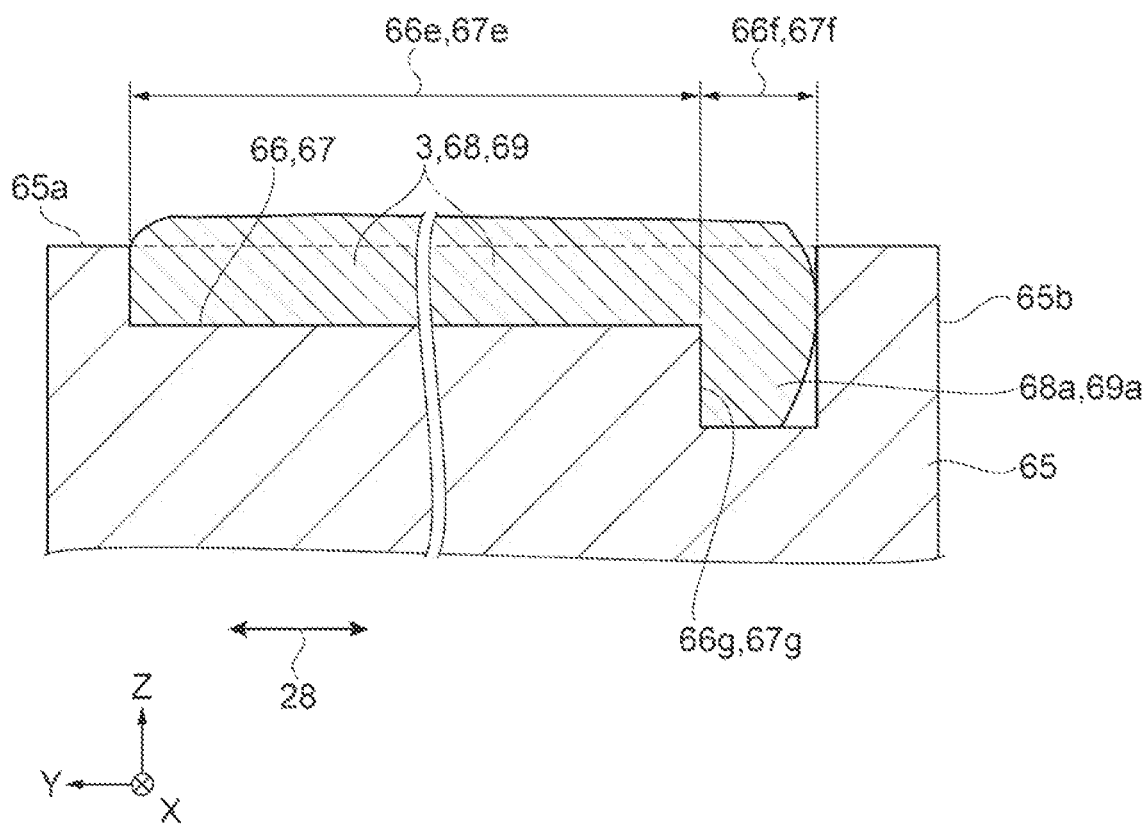
FIG. 16 is a schematic side sectional view of a main part of a stage according to a third embodiment.

As shown in FIG. 16, a shaping surface 65a of a stage 65 has a first groove 66 and a second groove 67. The stage 65 has a first side surface 65b that intersects with the shaping surface 65a on the negative Y side. The first groove 66 and the second groove 67 do not open on the first side surface 65b.

The first groove 66 includes a first shallow groove portion 66e and a first deep groove portion 66f. The first deep groove portion 66f is deeper than the first shallow groove portion 66e. The second groove 67 includes a second shallow groove portion 67e and a second deep groove portion 67f. The second deep groove portion 67f is deeper than the second shallow groove portion 67e.

In the girder layer forming step of step S2, the shaping material 3 is supplied to the first groove 66 to form a first girder layer 68. The shaping material 3 is supplied to the second groove 67 to form a second girder layer 69. A first protrusion 68a is formed by the first deep groove portion 66f. A second protrusion 69a is formed by the second deep groove portion 67f.

Compared with the shaping material 3 of the first shallow groove portion 66e and the second shallow groove portion 67e, the shaping material 3 hangs down in the negative Z direction in the first deep groove portion 66f and the second deep groove portion 67f. In the first groove 66, since the shaping material 3 is hooked by a first step side surface 66g, the shaping material 3 can be prevented from moving in the positive Y direction. In the second groove 67, since the shaping material 3 is hooked by a second step side surface 67g, the shaping material 3 can be prevented from moving in the positive Y direction.

Fourth Embodiment

In the first embodiment, a relative positional relationship between the nozzle 24 and the first groove 29 and the second groove 31 is set by calibration before shaping. The three-dimensional shaping device 1 may include a unit for detecting positions of the first groove 29 and the second groove 31. The unit for detecting the positions of the first groove 29 and the second groove 31 may be, for example, an imaging device, a laser measuring device, or the like.

Fifth Embodiment

In the first embodiment, two girder layers of the first girder layer 44 and the second girder layer 45 are formed in the girder layer forming step of step S2. The number of the girder layers may be three or more. This can couple the sacrificial layer 10 and the stage 2 to each other more firmly.

What is claimed is:

1. A three-dimensional shaping device, comprising:
a stage having a shaping surface in which first and second grooves are provided, the first and second grooves extending along a first direction, each of the first and second grooves having an open end at one end and a closed end at the other end, the open ends being exposed to an outside of the stage, other parts of the stage existing between the closed ends and the outside of the stage;
a discharge head configured to supply a shaping material to the shaping surface;
a motor configured to relatively move the stage and the discharge head;
a heater configured to heat the stage;
a memory configured to store a program; and
a processor configures to execute the program to control the discharge head and the motor so as to:
form a first girder layer by supplying the shaping material into the first groove while relatively moving the discharge head in the first direction with respect to the stage;
form a second girder layer by supplying the shaping material into the second groove while relatively moving the discharge head in the first direction with respect to the stage;
form a first floor layer spanning the first girder layer and the second girder layer by supplying the shaping material onto the shaping surface and first and second girder layers while relatively moving the discharge head with respect to the stage;
form a three-dimensional object on the first floor layer by supplying the shaping material onto the first floor layer; and
cause the heater to heat the stage to make an entirety of the three-dimensional object, the first floor layer, and the first and second girder layers to slide out from the stage to the outside of the stage.

2. The three-dimensional shaping device according to claim 1, wherein
each of a depth of the first groove and a depth of the second groove is 0.2 mm or more and 1 mm or less.

3. The three-dimensional shaping device according to claim 1, wherein
an angle formed by a first side wall, which is a side wall of the first groove on a side closer to the second groove, and the shaping surface is 70 degrees or more and less than 90 degrees, and
an angle formed by a second side wall, which is a side wall of the second groove on a side closer to the first groove, and the shaping surface is 70 degrees or more and less than 90 degrees.

4. The three-dimensional shaping device according to claim 1, wherein
the stage has a first side surface that intersects with the shaping surface, and
the open ends of the first and second grooves expose to te outside of the stage at the first surface of the stage.

5. The three-dimensional shaping device according to claim 1, wherein
the first floor layer is formed by supplying the shaping material onto the stage while the processor causes the discharge head to reciprocate in a direction that intersects with the first direction.

6. The three-dimensional shaping device according to claim 5, wherein
the processor is further configured to form a second floor layer by supplying the shaping material onto the first floor layer while the processor causes the discharge head to reciprocate in a direction that intersects the first direction, and
an area occupied by the shaping material per unit area of the second floor layer is larger than an area occupied by the shaping material per unit area of the first floor layer.

7. The three-dimensional shaping device according to claim 1, wherein
the first girder layer is formed on a side closer to the second groove in the first groove, and
the second girder layer is formed on a side closer to the first groove in the second groove.

8. The three-dimensional shaping device according to claim 1, wherein
a main component of a stage material, which is a material of the stage, is glass or aluminum.

9. The three-dimensional shaping device according to claim 1, wherein
the discharge head includes a nozzle configured to discharge the shaping material, and
each of widths of the first groove and the second groove on the shaping surface is wider than an outer diameter of the nozzle.

* * * * *